(12) United States Patent
Culpepper et al.

(10) Patent No.: US 8,233,796 B2
(45) Date of Patent: Jul. 31, 2012

(54) TIMING INTERFACE MODULE WITH DAUGHTER TIMING REFERENCE MODULES

(75) Inventors: Stephen Culpepper, Sharpsburg, GA (US); Jack C. Martin, Jr., Cumming, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 960 days.

(21) Appl. No.: 12/251,348

(22) Filed: Oct. 14, 2008

(65) Prior Publication Data
US 2010/0092177 A1    Apr. 15, 2010

(51) Int. Cl.
*H04J 14/08* (2006.01)
(52) U.S. Cl. .............. 398/52; 398/98; 398/99; 398/89
(58) Field of Classification Search .................. 398/154
See application file for complete search history.

(56) References Cited

U.S. PATENT DOCUMENTS 3,671,918 A * 6/1972 Mitchell .................. 439/49
7,468,891 B2 * 12/2008 Lipski et al. ............. 361/679.01

\* cited by examiner

*Primary Examiner* — Danny Leung
(74) *Attorney, Agent, or Firm* — Scott P. Zimmerman PLLC

(57) ABSTRACT

A timing interface module with daughter timing reference modules. The timing modules are provided in a rack platform to eliminate routing problems and which is compliant with all relevant industry standards. The timing reference module includes a face plate having first and second substantially rectangular openings, the face plate further comprising mounting slots for receiving mounting hardware therein and first and second timing modules, the first and second timing modules disposed within the first and second substantially rectangular openings. The first and second timing modules provide timing terminations for timing reference signals for network elements of a synchronized optical network.

18 Claims, 4 Drawing Sheets

TIMING INTERFACE MODULE WITH DAUGHTER TIMING REFERENCE MODULES

BACKGROUND

The present invention relates to systems and methods for network communications. More particularly, the present invention relates to a timing interface module with daughter timing reference modules.

The increasing use and expansion of digital voice, TV and Internet services continue to apply pressure for increased bandwidth. In fact, even more bandwidth-intensive services are on the horizon. This increased demand means service providers need to add capacity to their networks as quickly as possible. Previously, that process required the integration of additional hardware or even the complete replacement of existing networks because a service provider's network typically only allows so much data traffic to travel through at any given time.

However, advancements in optical transport systems fully integrate additional bandwidth capability in easily expandable modules. Moreover, such advancements are allowing providers to increase the bandwidth available on their existing networks without extensive network redesign or reconfiguration. For example, rather than installing additional stand-alone hardware, an optical transport system may be used to integrate pure optical switching via wavelength selective switches, reconfigurable optical add-drop multiplexing, Ethernet switching, next-generation SONET/SDH add-drop multiplexers and dense wavelength division multiplexing (DWDM) into a single platform. Thus, traffic may be added or dropped into a DWDM network to easily increase bandwidth to offer HDTV, video-on-demand and high-speed Internet access.

A SONET multiplexer enables carriers to cost-effectively combine signals of multiple optical carrier levels onto one wavelength for transport. Further, SONET network equipment transports and/or multiplexes traffic that has originated from a variety of different clock sources. Thus, SONET requires timing sources to provide synchronization. External timing connections provide the timing signals to ensure synchronous accuracy of the network. In contrast, other types of networks do not require timing, e.g., Ethernet, ATM, SAN, etc. For example, legacy DWDM and other data systems do not have external timing connections.

It can be seen then that there is a need for a method and apparatus for providing external timing to systems for combining synchronous and data signals while complying with all relevant industry standards.

SUMMARY

Exemplary embodiments address these and other issues by providing a timing interface module with daughter timing reference modules. Timing modules are provided in a rack platform to eliminate routing problems and which is compliant with all relevant industry standards.

According to one embodiment, a timing reference module includes a face plate having a first and second substantially rectangular opening, the face plate further comprising mounting slots for receiving mounting hardware therein and a first and second timing module, the first and second timing module disposed within the first and second substantially rectangular openings, wherein the first and second timing modules provides timing terminations of timing reference signals for network elements of a synchronized optical network.

These and other features and advantages will be apparent from a reading of the following detailed description and a review of the associated drawings. It is to be understood that both foregoing general description and the following detailed description are exemplary and explanatory only and are not restrictive.

DETAILED DESCRIPTION

In the following description, reference is made to the accompanying drawings that form a part hereof, and in which is shown by way of illustration exemplary embodiments. It is to be understood that embodiments are applicable to a timing interface module with daughter timing reference modules.

Figure 1:
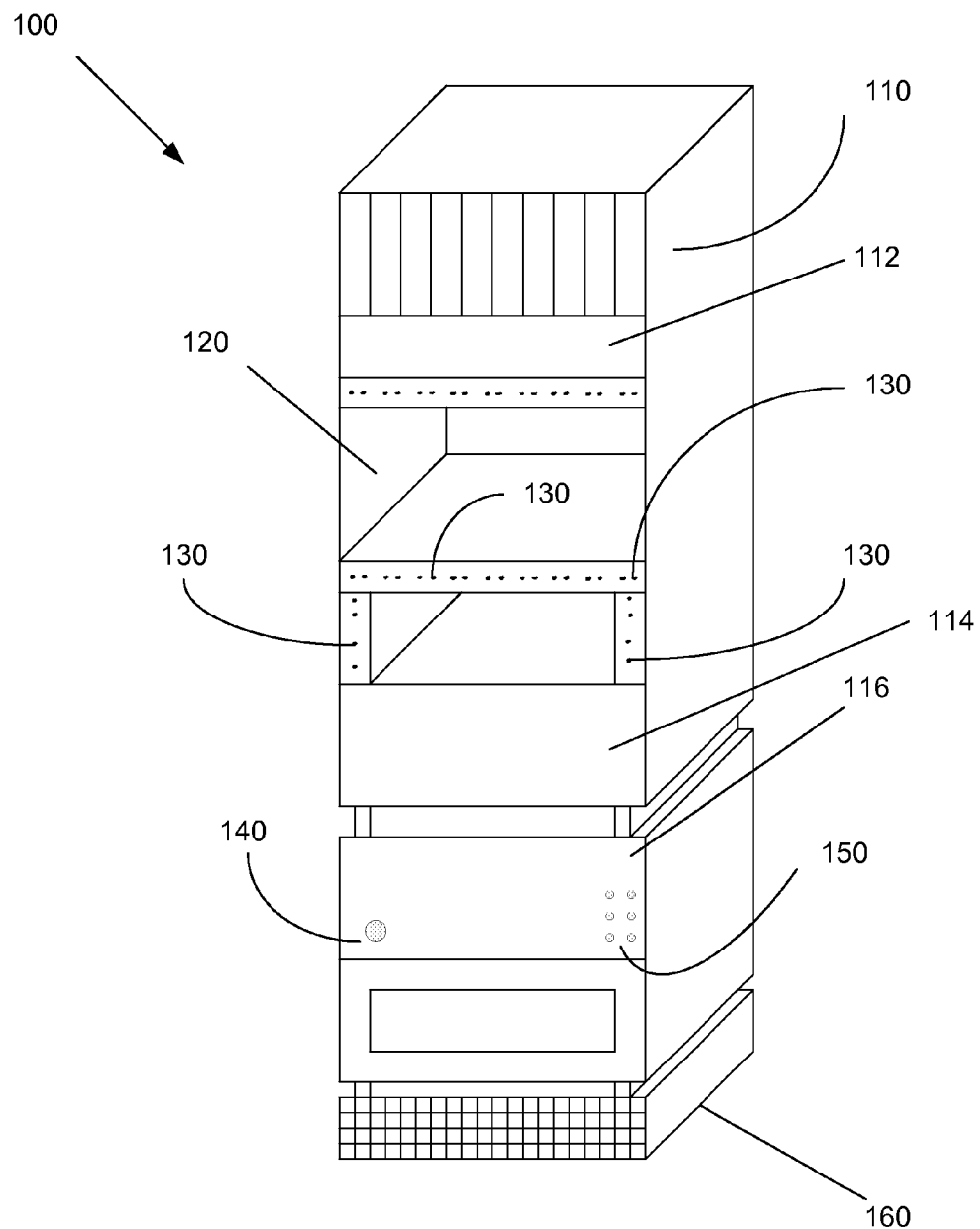
FIG. 1 illustrates a rack mounted optical transport system according to an embodiment.

FIG. 1 illustrates a rack mounted optical transport system 100 according to an embodiment. In FIG. 1, a plurality of components 112, 114, 116 are mounted in a rack 110. According to an exemplary embodiment, components 112, 114, 116 of the optical transport system 100 may include an optical transmission module, optical repeater module, optical reception module, etc. The optical transport system 100 conducts the processing, such as amplification, repeating, termination, add-drop, etc., with respect to optical signals. Moreover, a large number of optical cables (optical fibers) are brought into each optical transmission station that then carries out the processing, such as amplification, repeating, etc. A portion of the processed optical signal may be provided to an optical cable, while the remaining optical signal may be, for example, converted to an electric signal for transmission as a packet signal.

The amplification, repeating and other processing are conducted in the optical transport system 100. A plurality of shelves 120 may be configured as one unit on one rack to provide for an increase in mounting density of these shelves. The entire equipment in which a desired device works (or operates) in a rack may be referred to as a rack mount apparatus.

In FIG. 1, a front view of the optical transport system 100 is shown. Slots 130 are formed in a front surface side of shelf rack 120 so that each of the slots 130 allows the insertion of a plug-in unit, printed board unit or package. Connectors 140 may be provided on the front or at the back of the rack. Components 116 may provide lighted indicators 150 on the front to provide an indication of a state for the components 114 or to a signal status.

Although the size of a rack is determined according to the industry standard, for non-standard shelving the size of the shelf 120 may be designed to match the size of the rack to achieve the high-density mounting in one rack. The optical transport system 100 may also include an internal fan unit 160 with a cooling fan, for example, at the base of the optical transport system 100.

As mentioned above, advancements in transponder modules have led to fully integrated bandwidth capability in easily expandable modules. Moreover, such advancements are allowing providers to increase the bandwidth available on their existing networks without extensive network redesign or reconfiguration. With reference to FIG. 1, an optical transponder module may be simply plugged into a slot for coupling to a network's existing switches of the optical transport system 100 to provide a dramatic increase in capacity.

A SONET multiplexer may be installed in the rack mount system to enable a carrier to cost-effectively combine signals of multiple optical carrier levels onto one wavelength for transport. A timing interface module as described below may be mounted in the shelf 120 to provide timing signals to enable the signals from different clock sources to be synchronized.

Figure 2:
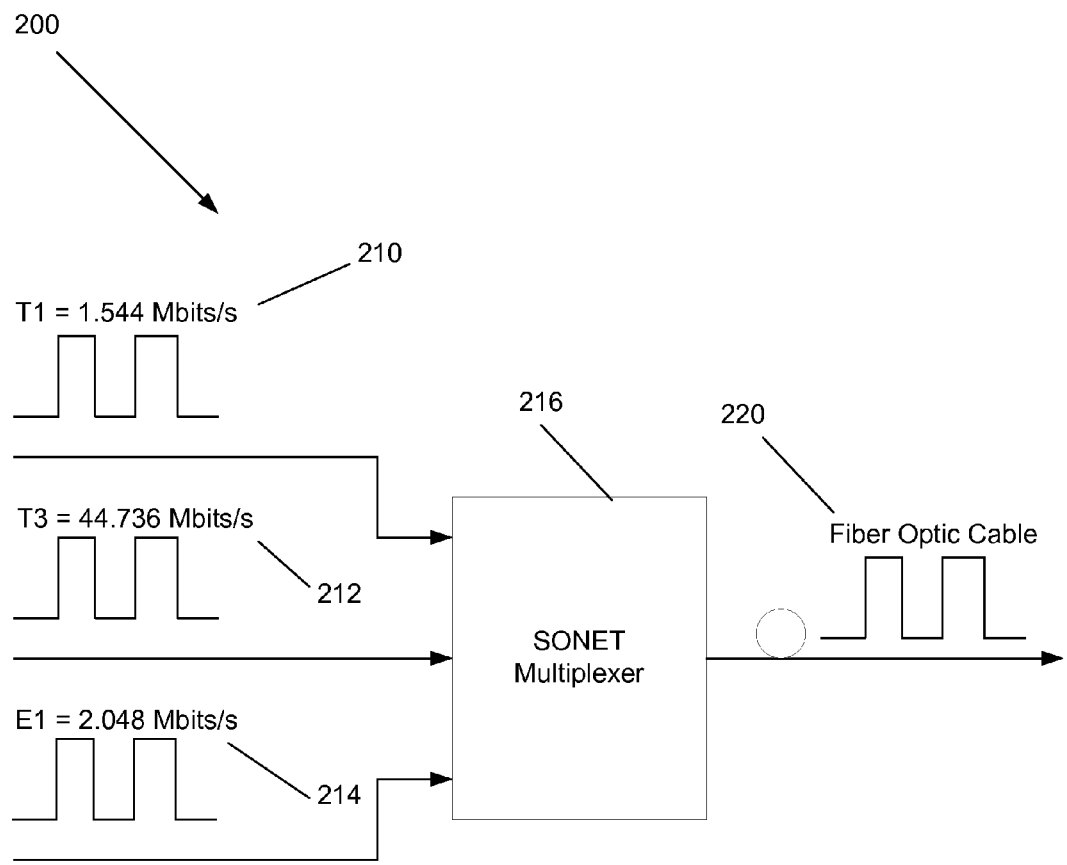
FIG. 2 illustrates a multiplexer in a SONET network according to an embodiment.

FIG. 2 illustrates a multiplexer in a SONET network 200 according to an embodiment. In FIG. 2, three datastreams 210, 212, 214 are shown as inputs to a SONET multiplexor 216. SONET allows datastreams of different formats to be combined onto a single high-speed fiber optic synchronous datastream 220. However, combining datastreams of different formats requires the connection of external timing source to synchronize the datastreams. Moreover, the timing source must be compliant with all relevant industry standards.

Figure 3:
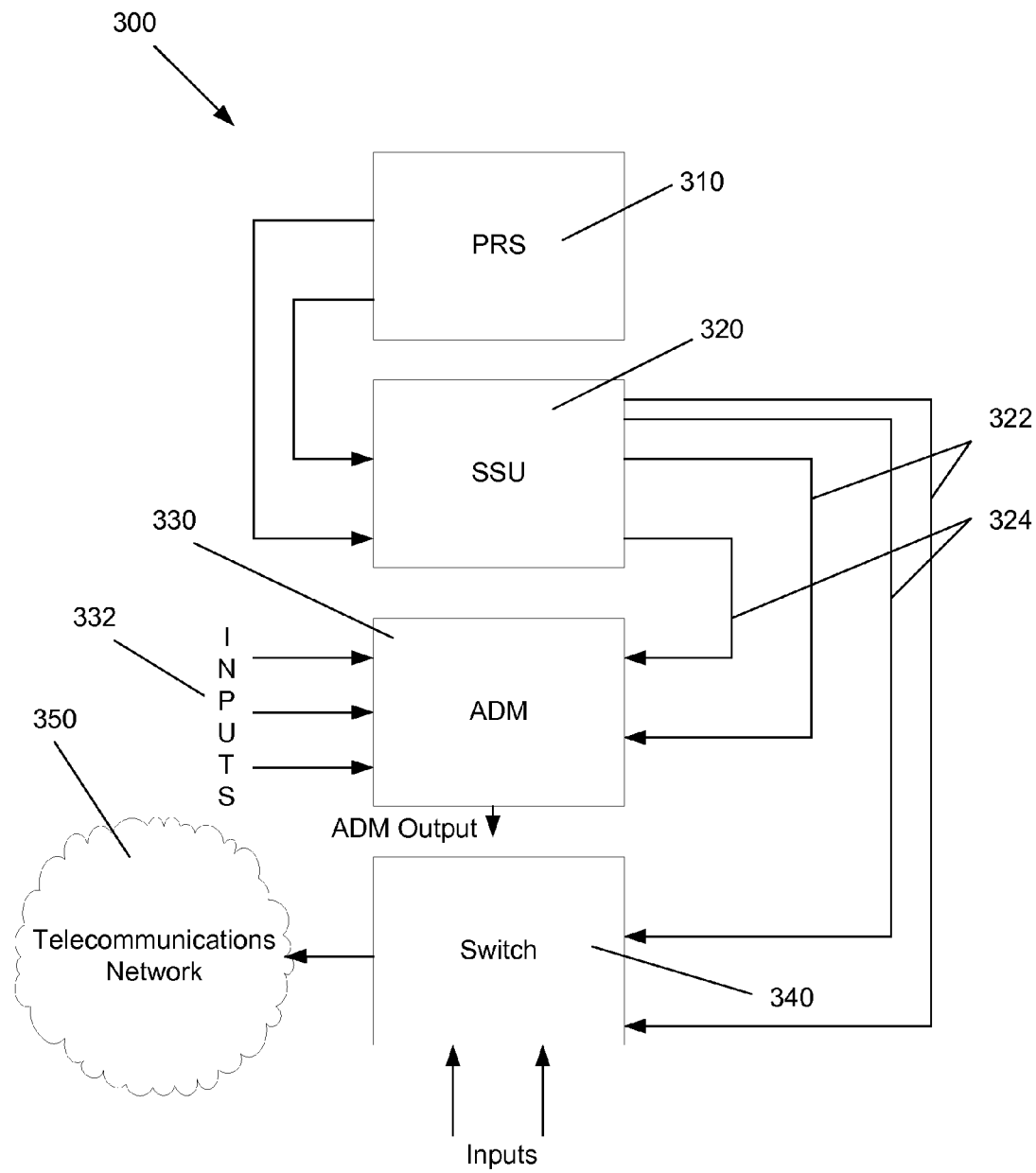
FIG. 3 shows a system using an external timing source.

FIG. 3 shows a system using an external timing source 300. In FIG. 3, a primary reference source (PRS) 310 provides signals to a synchronization supply unit (SSU) 320. The synchronization supply unit 320 provides primary 322 and secondary 324 timing signals to equipment, such as an add/drop multiplexer 330 and telecommunications switch 340. For example, the add/drop multiplexer 330 may be used to combine datastreams 332 of different formats as described above with reference to FIG. 2. The switch 340 may be coupled to a communications network 350, such as a cellular network.

Figure 4:
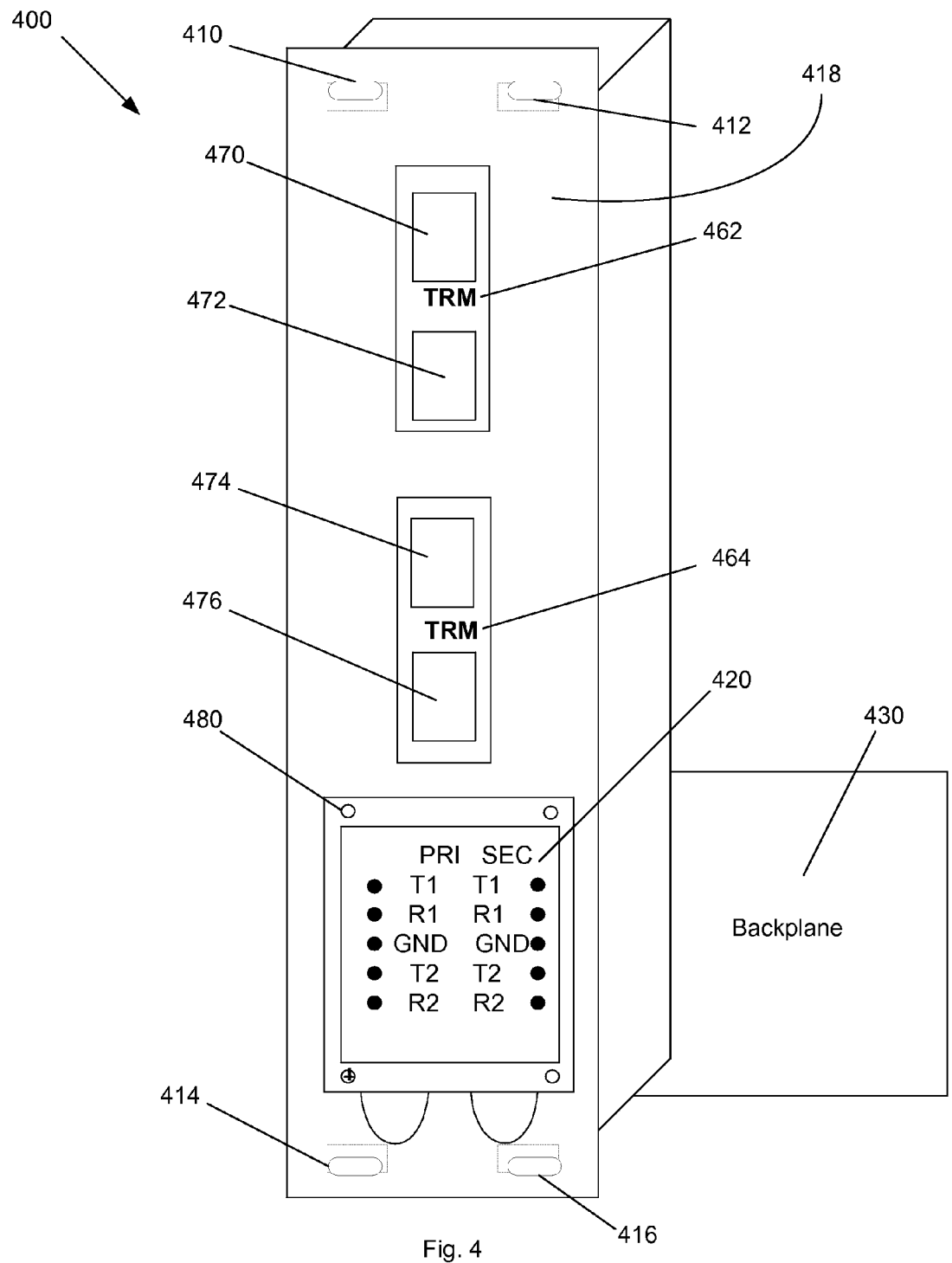
FIG. 4 illustrates a timing interface module according to an embodiment.

FIG. 4 illustrates a timing interface module 400 according to an embodiment. In FIG. 4, the timing interface module 400 is configured for mounting in a rack system, such as the rack mount system 100 illustrated in FIG. 1. The timing interface module 400 includes daughter timing reference modules 462, 464. The timing interface module 400 is designed as a circuit pack-like device that is slotted in the shelves of the rack mount system 100 shown in FIG. 1.

The timing interface module 400 may be permanently mounted in the rack mount system 100 of FIG. 1, for example, with four screws through mounting slots 410-416 in the faceplate 418. The timing interface module 400 provides timing terminations for any synchronous components that might be mounted in the rack. The timing interface module 400 may also include wire wrap pins 420 to physically tie down the synchronization signals. The wire-wrap pins are recessed and the cover provides strain relief for the timing cables that are terminated there. External cabling (other than the cables to the SSU) is not are not required. The two slots may be configured with redundant modules 462, 464 to provide copies of both the primary and secondary timing reference signals to the backplane 430. Accordingly, the timing interface module 400 provides a solution that will not require any external cabling to make connections between T1 timing reference termination points and distribution to the backplane of the rack mount system.

The timing interface module 400 according to an embodiment replaces the need for a previously required Timing Interface Bracket (TIB) and application of power for the timing interface module 400 is made simpler. In addition, the timing interface module 400 according to an embodiment eliminates the need for any special cables previously required to interconnect the TIB and timing reference modules (TRMs). The timing interface module 400 may therefore be installed so that an optical transport system may behave like a SONET NE with respect to timing connections, i.e., as if external timing were an option from the beginning. The dimensions of the timing interface module 400 may be configured to occupy two or more adjacent slots in a shelf of the rack mount system. Captive screws utilizing existing threaded holes in the chassis of the rack and threaded through the mounting slots 410-416 make the timing interface module 400 a semi-permanent extension of the shelf Sub-modules 462, 464 are the redundant Timing Reference Modules (TRM) that, as indicated above, provide copies of both the primary and secondary timing reference signals to the backplane 430. In addition, the sub-modules 462, 464 are easily removable using, for example, thumb-latches 470-476. An insulated metal cover 480 may be provided to protect wire-wrap pins 420 and provide mechanical strain relief for timing cables. Recessed wire-wrap pin fields 420 are provided for primary and secondary BITS clock connections.

Accordingly, the timing interface module 400 enables data and SONET services to be multiplexed onto a single wavelength. The combining of different services and data signals of different formats allows service providers to provide additional wavelength services. Additional advantages could be realized through cost savings for transport of IOF or other "internal" traffic.

The circuit pack-like device provided by the timing interface module 400 serves the same purpose as the backplane timing terminations found on all existing SONET network elements. Wire wrap pins physically tie down the synchronization signals. Thus, the timing interface module 400 eliminates the need for external cabling to make connections between the primary timing reference termination point and distribution to the backplane of the shelf.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A timing interface module, comprising:
    a face plate having a first substantially rectangular opening and a second substantially rectangular opening, the face plate further comprising a mounting slot for receiving mounting hardware therein;
    a timing module disposed within the first substantially rectangular opening, the first timing module receiving a reference timing signal and outputting the reference timing signal to a physical connector on an exterior surface of the face plate; and
    an optical multiplexer installed within the mounting slot, the optical multiplexer having a timing input connected to the physical connector of the timing modules, the optical multiplexer receiving the reference timing signal, the optical multiplexer also having other inputs that receive multiple data streams of different formats, the optical multiplexer synchronizing the multiple data streams to the reference timing signal, the optical multiplexer multiplexing the multiple data streams into an optical output of one wavelength.

2. The timing interface module of claim 1, wherein the mounting slot is configured for alignment with threaded mounting holes in a rack.

3. The timing interface module of claim 1, wherein the timing module comprises another physical connector for outputting the reference timing signal to a backplane.

4. The timing interface module of claim 1 further comprising wire wrap pins on the exterior surface of the face plate that also receive the timing reference signal.

5. The timing interface module of claim 4, wherein the wire wrap pins are recessed from the exterior surface of the faceplate.

6. The timing interface module of claim 5, further comprising an insulated metal cover for protecting the wire wrap pins.

7. The timing interface module of claim 4, further comprising an insulated metal cover for protecting the wire wrap pins.

8. The timing interface module of claim 1, further comprising a cable having an end connected to the physical connector on the exterior surface of the face plate and an opposite end connected to the timing input of the optical multiplexer.

9. The timing interface module of claim 1, further comprising a latch that releases the timing module from the face plate for removal.

10. A system for providing optical transport processing, comprising:
   a rack for mounting components of an optical transport system;
   a face plate having a first substantially rectangular opening and a second substantially rectangular opening, the face plate further comprising a mounting slot for receiving mounting hardware therein;
   a timing module inserted into the first substantially rectangular opening, the first timing module receiving a reference timing signal and outputting the reference timing signal to a physical connector on an exterior surface of the face plate; and
   an optical multiplexer installed within the mounting slot, the optical multiplexer having a timing input connected to the physical connector of the timing modules, the optical multiplexer receiving the reference timing signal, the optical multiplexer also having other inputs that receive multiple data streams of different formats, the optical multiplexer synchronizing the multiple data streams to the reference timing signal, the optical multiplexer multiplexing the multiple data streams into an optical output of one wavelength.

11. The system of claim 10, wherein the mounting slot aligns with threaded mounting holes in the rack.

12. The system of claim 10, wherein the timing module comprises another physical connector for outputting the reference timing signal to a backplane.

13. The system of claim 10, further comprising wire wrap pins on the exterior surface of the face plate that also receive the timing reference signal.

14. The system of claim 13, wherein the pins are recessed from the faceplate.

15. The system of claim 14, further comprising an insulated metal cover for protecting the wire wrap pins.

16. The system of claim 13, further comprising an insulated metal cover for protecting the wire wrap pins.

17. The system of claim 10, further comprising a cable having an end connected to the physical connector on the exterior surface of the face plate and an opposite end connected to the timing input of the optical multiplexer.

18. The system of claim 10, further comprising a latche that releases the timing module from the face plate for removal.

* * * * *